(12) United States Patent
Lee (10) Patent No.: US 10,096,963 B2
(45) Date of Patent: Oct. 9, 2018

(54) PULSE SLICER IN LASER SYSTEMS

(71) Applicant: LUMENIS LTD., Yokneam Ilit (IL)

(72) Inventor: John B. Lee, Ridgefield, CT (US)

(73) Assignee: LUMENIS LTD., Yokneam (IL)

( * ) Notice: Subject to any disclaimer, the term of this patent is extended or adjusted under 35 U.S.C. 154(b) by 0 days.

(21) Appl. No.: 15/807,418

(22) Filed: Nov. 8, 2017

(65) Prior Publication Data
US 2018/0076593 A1   Mar. 15, 2018

Related U.S. Application Data (63) Continuation of application No. PCT/US2017/022396, filed on Mar. 15, 2017.

(60) Provisional application No. 62/310,956, filed on Mar. 21, 2016.

(51) Int. Cl.
| | | |
|---|---|---|
| H01S 3/00 | (2006.01) | |
| H01S 3/092 | (2006.01) | |
| H01S 3/10 | (2006.01) | |
| H01S 3/127 | (2006.01) | |
| H01S 3/23 | (2006.01) | |
| H01S 3/16 | (2006.01) | |
| H01S 3/115 | (2006.01) | |
| H01S 3/0941 | (2006.01) | |
| G02B 27/28 | (2006.01) | |

(52) U.S. Cl.
CPC ............ *H01S 3/0057* (2013.01); *G02B 27/28* (2013.01); *H01S 3/092* (2013.01); *H01S 3/0941* (2013.01); *H01S 3/10015* (2013.01); *H01S 3/10061* (2013.01); *H01S 3/115* (2013.01); *H01S 3/127* (2013.01); *H01S 3/1611* (2013.01); *H01S 3/1643* (2013.01); *H01S 3/2308* (2013.01); *H01S 2301/08* (2013.01)

(58) Field of Classification Search
CPC ............... H01S 3/0057; H01S 3/06754; H01S 3/10015; H01S 3/10061; H01S 3/115; H01S 3/127; H01S 3/2308; H01S 2301/08
See application file for complete search history.

(56) References Cited

U.S. PATENT DOCUMENTS

| | | | | |
|---|---|---|---|---|
| 5,987,042 A | * | 11/1999 | Staver ................ | B23K 26/0069 372/10 |
| 6,191,385 B1 | * | 2/2001 | O Loughlin ......... | C21D 10/005 219/121.6 |
| 7,813,389 B2 | * | 10/2010 | Peng ................... | H01S 3/06754 372/26 |

(Continued)

*Primary Examiner* — Eric L Bolda
(74) *Attorney, Agent, or Firm* — ISUS Intellectual Property PLL; A. Jason Mirabito (57) ABSTRACT

An apparatus (such as a laser-based system) and method for providing optical pulses in a broad range of pulse widths and pulse energies uses a pulse slicer which is configured to slice a predefined portion having a desired pulse width of each of the one or more output optical pulses from a laser oscillator, in which timings of a rising edge and a falling edge of each sliced optical pulse relative to a time instance of a maximum of the corresponding each of the one or more output optical pulses from the laser oscillator, are chosen at least to maximize amplification efficiency of the optical amplifier, which may be located after the pulse slicer, and to provide the one or more amplified output optical pulses each having the desired pulse energy and pulse width.

18 Claims, 6 Drawing Sheets

(56) References Cited

U.S. PATENT DOCUMENTS

| | | | | |
|---|---|---|---|---|
| 8,309,885 | B2* | 11/2012 | Peng | H01S 3/2316 |
| | | | | 219/121.73 |
| 8,598,490 | B2* | 12/2013 | Hooper | H01L 21/6836 |
| | | | | 219/121.69 |
| 9,246,295 | B2* | 1/2016 | Kaganovich | H01S 3/0057 |
| 9,744,618 | B2* | 8/2017 | Sokol | B23K 26/0069 |
| 2007/0236771 | A1* | 10/2007 | Zadoyan | H01S 3/127 |
| | | | | 359/257 |
| 2008/0225386 | A1* | 9/2008 | Leitner | H01S 3/0604 |
| | | | | 359/348 |
| 2015/0336208 | A1* | 11/2015 | Sokol | B23K 26/0069 |
| | | | | 219/121.61 |

* cited by examiner

PULSE SLICER IN LASER SYSTEMS

RELATED APPLICATIONS

This application is a continuation application of PCT Application No. PCT/US17/22396, filed Mar. 15, 2017, which claims priority to U.S. Provisional Application Ser. No. 62/310,956, filed 21 Mar. 2016, the entire disclosure of which is herein incorporated by reference.

TECHNICAL FIELD

The invention generally relates to laser systems and applications, more particularly but not exclusively, this invention relates to providing optical pulses in a broad range of pulse widths and pulse energies.

SUMMARY OF THE INVENTION

According to a first aspect of the invention, an apparatus or a system includes a laser oscillator having a lasing medium and a back reflection mirror. An output mirror is configured to provide one or more output optical pulses. A pulse forming element is positioned between the reflection mirror and the output optical mirror, and is configured to provide formation of the one or more output optical pulses. A pulse slicer downstream is configured to slice a portion having a desired pulse width of each of the one or more output optical pulses. An optical amplifier downstream of the pulse slicer is configured to amplify the sliced portion of each of the one or more output optical pulses to a desired pulse energy to provide one or more amplified output optical pulses, wherein the timings of a rising edge and a falling edge of each sliced optical pulse, relative to a time instance of a maximum of the corresponding each of the one or more output optical pulses, is chosen at least to maximize amplification efficiency of the optical amplifier and to provide the one or more amplified output optical pulses each having the desired pulse energy and pulse width.

According further to the first aspect of the invention, the pulse forming element may be a Q-switch component. Further, the Q-switch component may be a single Pockels cell. Still further, the Pockels cell may be a dual Pockels cell, so that rising and falling edges of the each sliced optical pulse may be provided by two separate crystals respectively. Yet still further, the two separate crystals may be in series and run by two different voltage drivers connected in parallel.

Still further according to the first aspect of the invention, a range of pulse widths of the amplified output pulses may be between 8 nanoseconds and 500 picoseconds.

According further to the first aspect of the invention, the lasing medium may comprise a solid-state material. Further, the solid-state material may be a neodymium-doped yttrium aluminum garnet (Nd:YAG). Yet still further, the lasing medium may comprise a solid-state material pumped by an array of semiconductor lasers. Further still, the lasing medium may comprise a solid-state material pumped by a double flash lamp.

According still further to the first aspect of the invention, the timings of the rising edge and the falling edge of each sliced optical pulse relative to the time instance of the maximum of the corresponding each of the one or more output optical pulses may be determined from a matrix stored in a memory of the apparatus, the matrix being generated for predetermined ranges of input parameters including at least a range of desired pulse widths and a further range of desired pulse energies of the one or more amplified output optical pulses. Further, the initially determined timings of the rising and falling edges of the each sliced optical pulse may be further finely tuned by small changes in the determined timings for optimizing the amplified output optical pulses using an iteration process performed automatically.

According yet further still to the first aspect of the invention, the initially determined timings of the rising and falling edges of the each sliced optical pulse may be further finely tuned by small changes in the determined timings for optimizing the amplified output optical pulses using an iteration process performed automatically.

Yet still further according to the first aspect of the invention, the pulse slicer may be located outside of the laser oscillator.

Still yet further according to the first aspect of the invention, the pulse slicer may be located inside of the laser oscillator between the reflection mirror and the output optical mirror.

According to a second aspect of the invention, a method includes the steps of: receiving, by a controller in an apparatus from a user interface, input parameters for one or more output amplified optical pulses including at least a desired pulse width and an energy related parameter determining a desired pulse energy for each of the one or more pulses; providing, by the controller, in response to the received input parameters, a command signal to start a pulsed laser operation by a laser oscillator of the apparatus; receiving, by the controller from an optical detector (OD), a replica signal of laser output pulses generated by the laser oscillator; and determining, based on the received replica signal and at least in part using the input parameters, timings of a rising edge and a falling edge for each of one or more sliced optical pulses relative to a time instance of a maximum of each of the corresponding one or more laser output pulses generated by the laser oscillator to maximize amplification efficiency of an optical amplifier configured to amplify the one or more sliced optical pulses and to provide one or more amplified output optical pulses each having the desired pulse energy and pulse width.

According further to the second aspect of the invention, the method may further comprise: providing fine tuning by small iterations of the determined timings of the rising and falling edges.

According still yet further to the second aspect of the invention, the pulse slicer may be located outside of the laser oscillator.

The single Pockels cell or the dual Pockels cell comprise one or more crystals, a central terminal and two end terminals, and wherein the central and each end terminals form a Pockels cell switching element to implement the pulse slicer.

BRIEF DESCRIPTION OF THE DRAWINGS

These and other features and aspects of the present disclosure will become better understood when the following detailed description is read, with reference to the accompanying drawings, in which like characters represent like parts throughout the drawings, wherein.

DETAILED DESCRIPTION OF THE PRESENT INVENTION

Various medical and industrial applications of pulsed optical laser systems require a broad range of pulse widths, pulse energies per pulse, fluences (energies per unit square), repetition rates, etc. Up-to-date, different techniques, have been used to reach this kind of flexibility, but have had only a limited success. For example, one remaining challenge is to "patch" a nanosecond range, e.g., generated by Q-switched lasers, and a picosecond range generated by mode-locked lasers (passively or actively mode-locked). One approach for solving such a problem for continuously tuning through a broad range of pulse widths (e.g., nanosecond to picosecond range) can be implemented according to various embodiments of the invention described below. An apparatus (such as a laser-based system) and method are presented for providing optical pulses in a broad range of pulse widths and pulse energies using a pulse slicer which is configured to slice a predefined portion having a desired pulse width of each of the one or more output optical pulses from a laser oscillator, where timings of a rising edge and a falling edge of each sliced optical pulse relative to a time instance of a maximum of the corresponding each of the one or more output optical pulses from the laser oscillator are chosen at least to maximize amplification efficiency of the optical amplifier, which may be located after the pulse slicer, and to provide the one or more amplified output optical pulses each having the desired pulse energy and pulse width.

For example, according to one embodiment of the invention, an apparatus (or a pulsed optical system), may comprise a laser oscillator, which may typically comprise a lasing medium, a back reflection mirror, an output mirror for providing one or more output optical pulses, and a pulse forming element between the reflection mirror and the output optical mirror (e.g., inside of the laser cavity), configured to provide formation of the one or more output optical pulses (operation in a single pulse mode or repetitive pulse mode). A pulse slicer, following the laser oscillator, can slice a portion having a desired pulse width from each of the one or more output optical pulses, which can be further amplified by an optical amplifier, configured to amplify the sliced portion of each of the one or more output optical pulses to a desired pulse energy to provide one or more amplified output optical pulses. The timings of the rising edge and the falling edge of each sliced optical pulse, in order to provide the amplified output optical pulse with the desired pulse energy and pulse width, can be chosen using different algorithms according various embodiments described herein.

Figure 1:
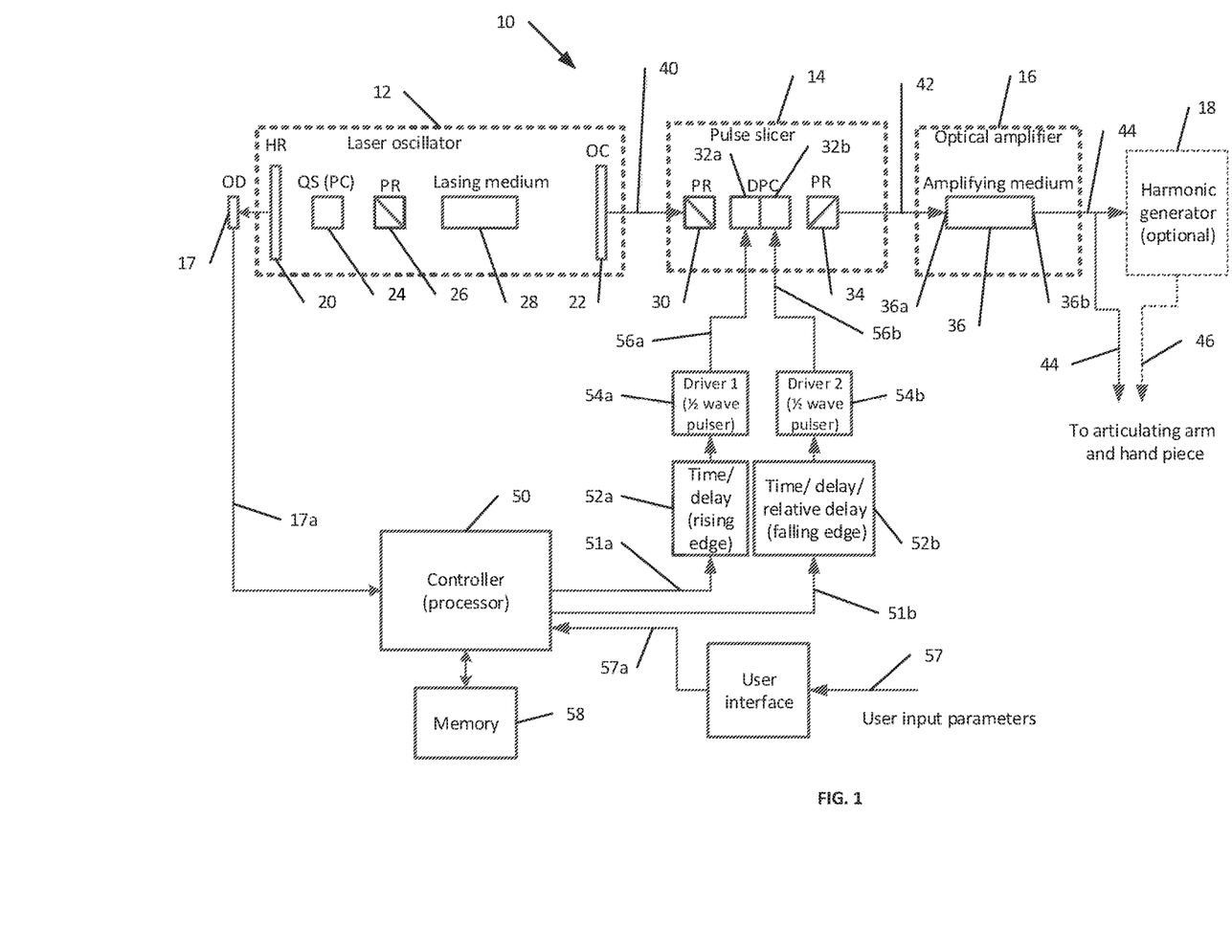
FIG. 1 is an exemplary block diagram of a laser system (apparatus) comprising a laser oscillator such as a Nd:YAG pulsed laser, a pulse slicer and an optical amplifier, according to an embodiment of the invention.

The embodiments described herein can be applied to different types of lasers, amplifiers and laser systems using different types of lasing medium such as solid-state, semiconductor, gas and the like. Exemplary embodiments described herein may be applied to the solid-state lasers/amplifiers using a laser rod comprising a neodymium-doped yttrium aluminum garnet (Nd:YAG) as shown in FIG. 1. The lasing media in such lasers/amplifiers can be pumped by an array of semiconductor lasers, by a flash lamp, by a double-flash lamp and the like.

Moreover, according to further embodiments, the pulse forming element in a laser cavity may be a lasing medium pumped by a pulsed flash lamp. Different types of modulation (active Q-switching) can be used for short optical pulse forming, which may be facilitated, for example, by a mechanical device (shutter, chopper wheel, spinning mirror/prism), an acousto-optic device or an electro-optic device such as Kerr cell or Pockels cell and the like. Also, a passive Q-switch using a storable absorber can be utilized for short optical pulse forming in the laser cavity as well.

According to a further embodiment, the pulse slicer can comprise a modulation component similar to the Q-switch component described herein. For example, the pulse slicer may be a single Pockels cell or a dual Pockels cell. In a single Pockels cell placed between two crossed polarizers, the input optical pulse can be sliced, e.g., by applying a half wave voltage (causing 90° rotation of the polarization plane) at least for a duration of a desired optical pulse to provide a transmission of the pulse through the slicer. Sharper defined pulses (sharp rising and falling edges) may be achieved using a dual Pockels cell, where rising and falling edges of each sliced optical pulse are provided using two separate crystals respectively (being in series) with two corresponding drivers connected in parallel (as demonstrated in FIG. 1).

According to still another embodiment, the pulse slicer (such as Pockels cell) can comprise an input polarizer and an output polarizer which is crossed with the input polarizer, to provide an optical isolation (among other functions described herein) between the laser oscillator and the optical amplifier, as demonstrated in FIG. 1.

Determining the timings of a rising edge and a falling edge of a sliced optical pulse within a corresponding output laser pulse can be performed using different methods. For example, in one embodiment, the rising edge and the falling edge of the sliced optical pulse relative to a time instance of a maximum of a corresponding output optical pulses (from the laser oscillator) can be determined from a matrix stored in a memory of the apparatus (laser system), the matrix being generated for predetermined ranges of input parameters including at least a range of desired pulse widths and a further range of desired pulse energies of an amplified output optical pulse (from an optical amplifier). Output parameters of such matrix can be timings of the rising edge and the falling edge (and/or a delay between the rising and falling edges) of the sliced optical pulse. After such timings are determined from the matrix, they can be appropriately applied (as discussed in reference to FIG. 1), and corresponding one or more amplified output optical pulses with the desired pulse width and energy can be provided.

According to another embodiment of the invention, the timings of the rising edge and the falling edge of each sliced optical pulse relative to the time instance of the maximum of the corresponding pulse of the one or more output optical pulses can be determined analytically (e.g., see Equations 1 and 2 discussed below) by a predefined algorithm using at least a replica signal of the laser output pulses from the laser oscillator detected by an optical detector (OD) placed in a predefined location in the system, and input parameters from a user interface (such as LCD screen) provided by a user for the one or more amplified output optical pulses including at least the desired pulse width and an energy related parameter determining the desired pulse energy.

A more analytical approach (more like a hybrid of the analytical and empirical approaches) may be practiced as well as further discussed herein in reference to FIG. 1 (e.g., see Equations 1 and 2 discussed below).

Still according to a further embodiment, the initially determined timings (e.g., from the predefined matrix or using analytical approach) of the rising and falling edges of the each sliced optical pulse may be further finely tuned empirically by small changes in the determined timings for optimizing the amplified output optical pulses using an automatic iteration process. This fine tuning may be needed to compensate for timely changes of system parameters, system nonlinearities and temperature variations.

According to various embodiment described herein, a continuous pulse width change can be achieved in a broad time interval. Especially the time interval of interest can be between nanosecond and picosecond ranges, where different techniques, e.g., Q-switching and mode-locking needs to be used which may require different configurations, so it is difficult to achieve a continuous pulse width tuning while maintaining, e.g., a desired pulse energy in these nanosecond and picosecond time ranges. The configuration utilizing a laser oscillator, a pulse slicer followed by an optical amplifier, described herein, can allow to achieve a broad pulse width tuning range, for example, from a few or tens of nanoseconds to 100 picoseconds and beyond. For example, for a system demonstrated in FIG. 1, a range of pulse widths of the amplified output pulses can be routinely set at least between 8 nanoseconds and 500 picoseconds, but can be further extended using various system parameters. FIGS. 1 through 5 further demonstrate various exemplary embodiments for practicing the invention.

FIG. 1 is an exemplary block diagram of a laser system (apparatus) 10 comprising a laser oscillator 12 such as Nd:YAG pulsed laser, a pulse slicer 14 and an optical amplifier 16, according to an embodiment of the invention. FIG. 1 is a simplified block diagram showing a number of devices and components suitable for use in practicing various embodiments of this invention and a specific order and manner in which components are configured to cause the apparatus/system to operate.

The laser oscillator 12 can be a pulsed Q-switched Nd:YAG pulsed laser with output optical pulses 40 having a fundamental wavelength 1064 nm, a pulse width in a nanosecond range and a spatially multimode structure (for providing better stability). The laser oscillator 12 comprises a back high reflector mirror 20, a front mirror/output coupler 22 (mirrors 20 and/or 22 may be flat or slightly curved). The laser cavity (between mirrors 20 and 22) may typically have a laser medium 28 such as Nd:YAG rod (also other materials, e.g., Nd:YAG, Nd:YLF, alexandrite, glasses and the like can be used) pumped by optical pulses from a flash lamp (not shown in FIG. 1) or from semiconductor laser arrays (not shown in FIG. 1). The laser may be either single longitudinal mode (single-mode) or may be multi longitudinal mode (multi-mode).

Moreover, Q-switching in the laser oscillator 12 can be provided by a Pockels cell 24 (e.g., KDP, KD*P, lithium niobate and the like) and a polarizer 26. The operation of the Pockels cell 24 can be described as follows. A voltage can be applied to the Pockels cell 24 to provide a quarter-wave plate which converts the linearly polarized light incident on it (from the polarizer 26) into a circularly polarized light. The back high reflector mirror 20 reflects the light and reverses its direction of rotation, so that on repassing through the Pockels cell 24 the light emerges as plane polarized light but at 90° to its original direction of polarization.

Therefore, this light is not transmitted by the polarizer, and the cavity is "switched off". When the voltage is reduced to zero, there is no rotation of the plane of polarization and Q-switching occurs. The change of voltage, which is synchronized with the pumping mechanism can be accomplished in less than 10 ns and very effective Q-switching can occur. An addition quarter-wave plate can be used, e.g., between the polarizer 26 and the laser medium 28 to remedy depolarization loss in the Nd:YAG rod 28.

Furthermore, the pulse slicer 14 in FIG. 1 shown downstream of the oscillator 12 comprises two cross polarizers 30 and 34 with a dual Pockels cell between them, the dual Pockels cell comprising two parts (crystals) 32a and 32b respectively between the polarizers 26 and 28 (the polarizers 26 and 28 providing an optical isolation between the laser oscillator 12 and the optical amplifier 16, as described herein and as shown in FIG. 1 as being downstream of the pulse slicer 14). The Pockels cell crystals 32a and 32b may be similar type crystals as used for the Pockels cell 24 discussed above. Two electrical drivers 54a and 54b can provide corresponding half-wave voltages 56a and 56b to the corresponding crystals 32a and 32b at determined times for the rising and falling edges of the corresponding sliced pulse.

Specifically, the half-wave voltage 56a provided by the electrical driver 54a to the crystal 32a will rotate 90° the polarization plane of the input optical pulse 40 so that it would go through the polarizer 34 without a loss, defining the rising edge of the output pulse 42. Then the half-wave voltage 56b provided by the electrical driver 54b to the crystal 32b will further rotate 90° the polarization plane of the input optical pulse 40, so that no optical pulse would longer go through the polarizer 34 (thus defining the falling edge of the sliced pulse).

Practically, the rising and falling edges of the optical pulse 42 in configuration shown in FIG. 1 can be determined by the rising edges of the electrical half-wave signals 56a and 56b provided by the corresponding drivers 54a and 54b. Fast electronics which is capable of generating sub-nanosecond/picosecond transition times (at least for the rising edge) is available based on the current state of technology (e.g., using, by way of example, avalanche transistors).

According to a further embodiment, in order to optimize the optical pulse 42, the electrical half-wave signals 56a and 56b can be used in an appropriate timing coordination with the output laser pulses 40 generated by the laser oscillator 12, further depending on a number of parameters including at least a desired pulse width and energy, and intrinsic properties (such as stimulated emission time constant) of the optical amplifier 16. As stated above, determining the timings of the rising edge and the falling edge of a sliced optical pulse (within an output laser pulse) can be accomplished using different methods such as building an empirical matrix, using a more analytical approach, and/or providing further fine tuning as described herein. The reason for determining of timings of the rising and falling edges for the sliced pulses may be providing respectful time delays values (signals 51a and 51b) to the modules 52a and 52b which then apply corresponding time delays to the signals 56a and 56b generated by the drivers 54a and 54b respectively. It is noted that the signals 51a and 51b may provide delays independent of each other, or having, for example, the signal 51b providing the delay relative to the signal 51a.

The generation of the signals 51a and 51b can be accomplished by a controller/processor 50 using a memory 58 and a signal 17a from an optical detector (OD) 17 monitoring optical pulses generated by the laser oscillator 12 (e.g., through the back mirror 20) as shown in FIG. 1. It is noted, as known in the art, the OD 17 can be placed or in other portions of the system 10. Based on the time reference provided by the OD 17 for laser pulses generated by the laser oscillator 12, and based on the input parameters (such as the desired pulse width and energy), the controller/processor 50 in conjunction with a memory 58 (e.g., used for storing the matrix information) can be used to manage the operation of the apparatus/system 10.

For example, in one embodiment, the rising edge and the falling edge of a sliced optical pulse relative to a time instance of a maximum of a corresponding output optical pulse (from the laser oscillator) can be determined from a matrix stored in a memory 58 of the apparatus (laser system) 10, the matrix being generated empirically (as a part of pre-calibration) for predetermined ranges of input parameters including at least a range of desired pulse widths and a further range of desired pulse energies of an amplified output optical pulse from the optical amplifier 16. Output parameters of such a matrix can be timings of the rising edge and the falling edge (also a delay between the rising and falling edges) of the sliced optical pulse can be provided as signals 51a and 51b to the corresponding time delays modules 52a and 52b, as described herein. After such timings are determined from the matrix, they can be appropriately applied (as discussed in reference to FIG. 1) and corresponding one or more amplified output optical pulses with the desired pulse width and energy can be generated as output optical pulses 44 of the amplifier 16.

Still in a further embodiment, the values of timings of the rising edge and the falling edge of a sliced optical pulse relative to a time instance of a maximum of a corresponding output optical laser pulse can be determined analytically by the controller/processor 50 using an empirical dependence of the corresponding delays as a function of the time width of the desired pulse widths of an amplified output optical pulse. For example, a simple linear dependence can be established empirically (as a part of pre-calibration) as follows. For a desired sliced optical pulse width $T_p \leq Tth$, ($T_{th}$ being an empirical threshold value) the time delay relative to the time instance of a maximum of a corresponding output optical pulse, dt, is equal to zero. In other words, if the $T_{th}=1$ ns, and the desired sliced optical pulse is 1 nanosecond or less, then $$dt=0 \quad (1)$$

However, if the Tp>Tth, the time dt may be determined/estimated using an empirical relationship. For example, a simple (empirically determined) relationship can be established as follows:

$$dt = A_1 T_p^2/(T_p+1) + A_2 T_p \quad (2)$$

where $A_1$ and $A_2$ are empirically determined coefficients for a specific system (many other simple approximations can be also used).

Figure 4A:
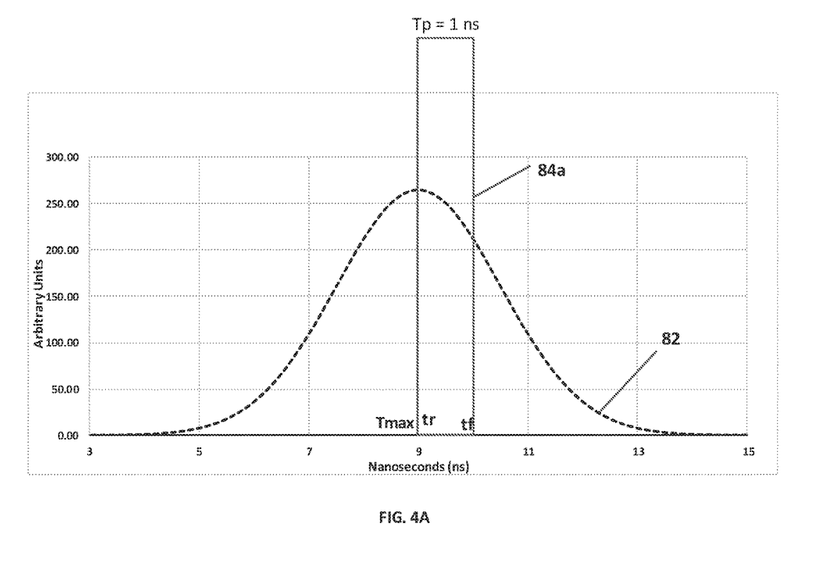
FIGS. 4A-4C are exemplary time plots of simulated sliced pulses of different pulse width relative to a time instance of a maximum (Tmax) of a corresponding output optical laser pulse, according to one embodiment of the invention.
Figure 4B:
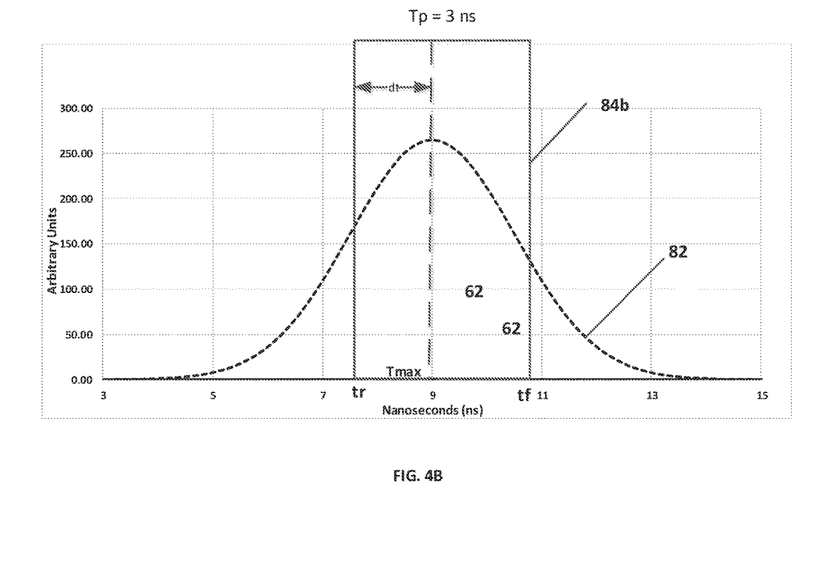
Figure 4C:
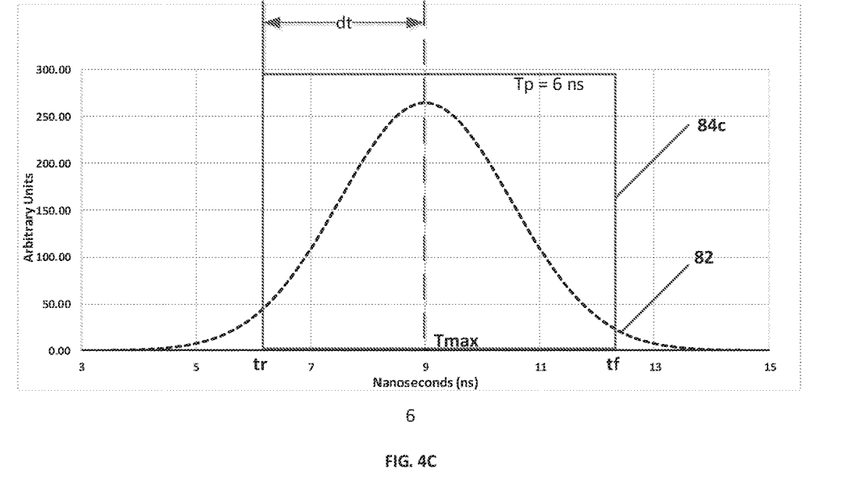

It is noted that the sliced optical pulses shown in FIGS. 4A-4C demonstrate how the dt can change as a function of the desired sliced optical pulse width $T_p$ within the laser output pulse 40 having an approximately Gaussian shape with a pulse width of about 4 ns (measured at FWHM, full width half maximum). For example, if $T_{th}=1$ ns, then in FIG. 4A, the d t=0 (per Equation 1). Then the rising edge of the sliced pulse 84a coincides with the maximum of the corresponding output optical laser pulse 82. For a longer pulse with the $T_{th}=3$ ns, as shown in FIG. 4B, the dt=1⅜ ns, which is calculated using Equation 2 with the empirically chosen coefficients $A_2=⅓$ and $A_1=⅙$.). For even longer pulse with the Tth=6 ns, as shown in FIG. 4C, the dt=26/7 ns, which is calculated using Equation 2 with the same coefficients A2=⅓ and A1=⅙. It is noted that for the longer pulse with Tp=6 ns, the sliced pulse 84c in FIG. 4C is almost symmetrical relative to the laser output pulse 82. For an intermediate sliced pulse 84b it is still quite asymmetrical relative to the maximum of the corresponding output optical laser pulse 82.

It is further noted that the asymmetry of the sliced pulses discussed above can be caused by a nonlinear stimulated emission in the laser amplifier 16, so that in order to provide a uniform and stable amplification of the sliced pulses, asymmetry, according embodiments described herein, may be necessary. In other words, if the sliced pulses would be chosen to be symmetrical (as demonstrated in FIG. 3), it may not have the desired energy and efficiency for generating the amplified optical pulses 44. The laser amplifier medium can be designed similar to the laser medium 28, using the Nd:YAG rod similarly pumped by the pulsed flash lamp.

According to further embodiment, as described above, the values of the corresponding timings for rising and falling edges and corresponding delays for each sliced optical pulse may be further finely tuned using small changes in the determined timings for optimizing the amplified output optical pulses, i.e., using an iteration process performed automatically by measuring the quality of the output amplified pulses 44.

Furthermore, FIG. 1 shows an optional harmonic generator 18 which can be used for generating different harmonics 84 (e.g., second harmonic at 532 nm) of the fundamental 1064 nm wavelength of the amplified output optical pulses 44 to extend the capabilities of the laser system 10. The outputs pulses 44 and 46 can be provided, e.g., to corresponding articulating arm and hand piece for applications such as surgical applications and the like of the laser system 10.

Various embodiments of the memory 58 (e.g., computer readable memory) may include any data storage technology type which is suitable to the local technical environment, including but not limited to: semiconductor based memory devices, magnetic memory devices and systems, optical memory devices and systems, fixed memory, removable memory, disc memory, flash memory, DRAM, SRAM, EEPROM and the like. Various embodiments of the controller processor 50 may include but are not limited to: general purpose computers, special purpose computers, microprocessors, digital signal processors (DSPs), multi-core processors, embedded, and System on Chip (SoC) devices.

Also, according to a further embodiment, the pulse slicer 14 may be located inside of the laser oscillator 12 between the reflection mirror 20 and the output optical mirror 22.

Figure 2:
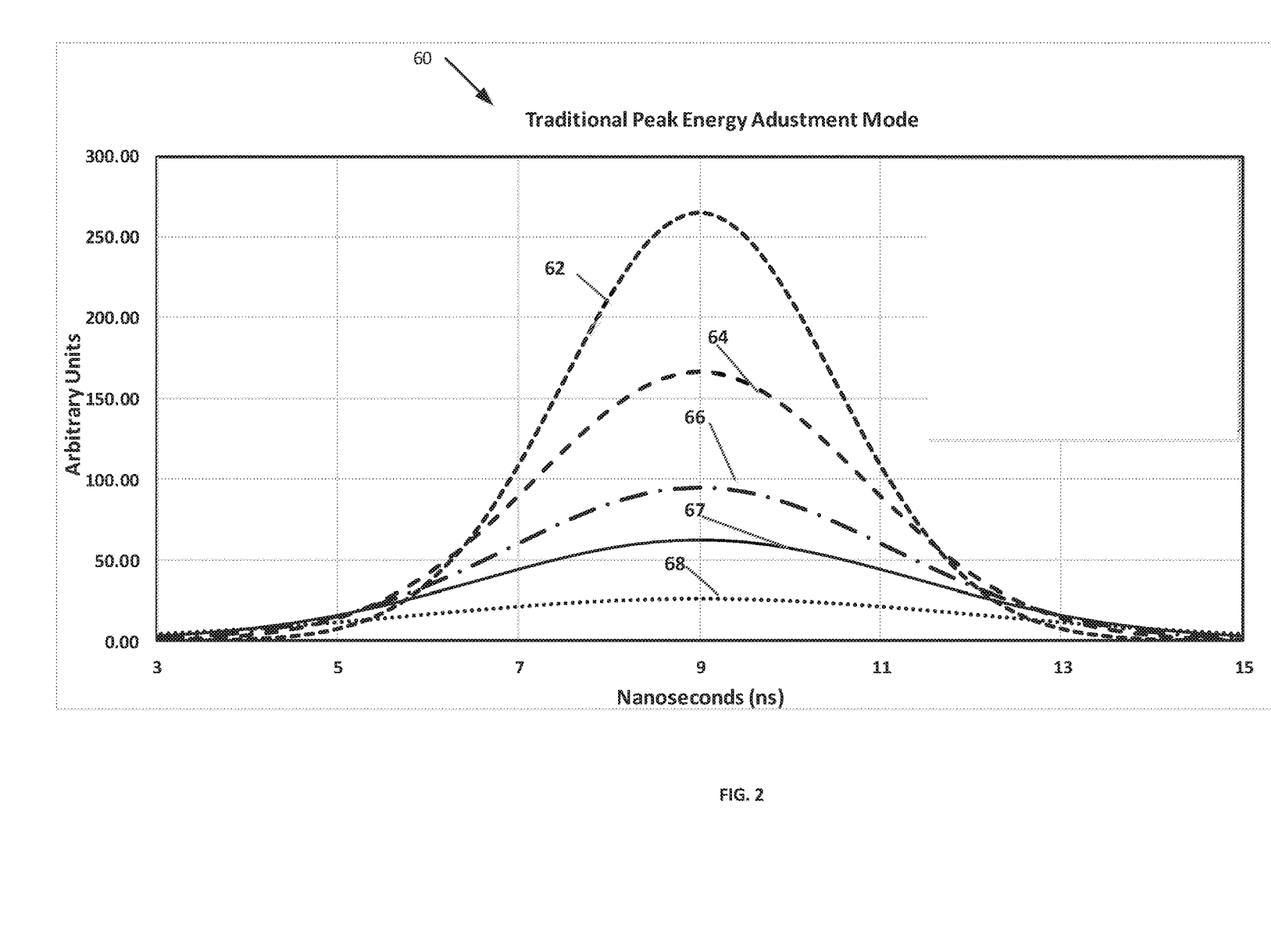
FIG. 2 is exemplary plot of various pulse shapes in a time domain of the output optical pulses from the Q-switched Nd:YAG laser oscillator demonstrating peak energy adjustment mode of the pulse width and pulse energy for practicing various embodiments of the invention.

FIG. 2 is exemplary plot 60 of various pulse shapes in a time domain of the output optical pulses 40 demonstrating traditional peak energy adjustment mode of the pulse width and pulse energy from the Q-switched NG:YAG laser oscillator 12 shown in FIG. 1 for practicing various embodiments of the invention.

Figure 3:
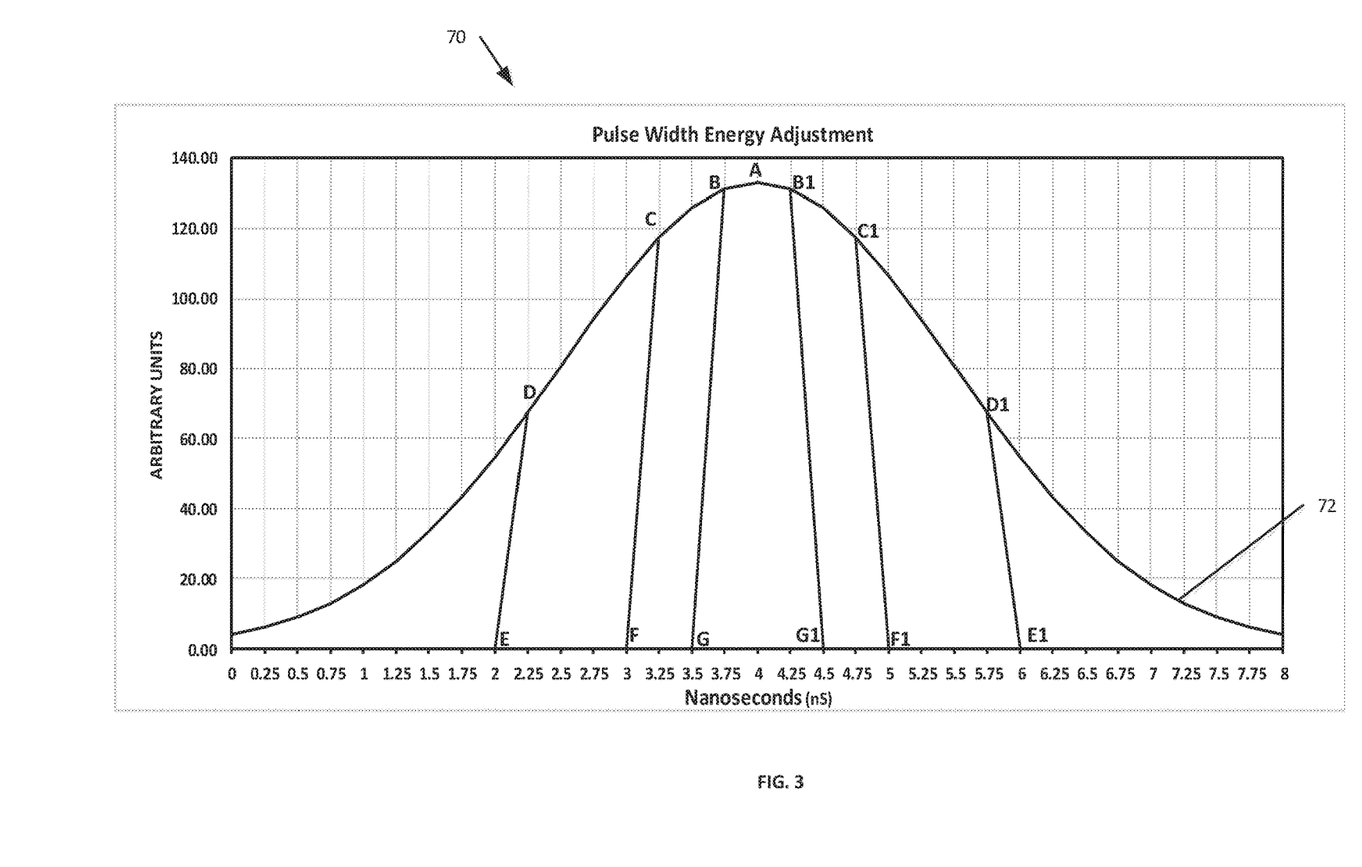
FIG. 3 is an exemplary plot of a sliced pulse width in a time domain for a laser system similar to the one shown in FIG. 1, but with the optical amplifier being placed before the pulse slicer right after the laser oscillator.

Different peak energies and pulse widths can be achieved by the power variation of the flash lamp pumping the laser medium 28 as demonstrated in FIG. 3. A curve 62 corresponds to a full pulse of 2000 mJ with 4 ns pulse width (measured at FWHM, full width half maximum), a curve 64 corresponds to a 75% amplitude pulse of 1500 mJ with 4.25 ns pulse width, a curve 66 corresponds to a 50% amplitude pulse of 1000 mJ with 5.75 ns pulse width, a curve 67 corresponds to a 40% amplitude pulse of 800 mJ with 6.25 ns pulse width, and a curve 68 corresponds to a 20% amplitude pulse of 400 mJ with 8.5 ns pulse width. By varying the pumping power of the flash lamp any curve, if necessary, can be used to provide the desired pulse width and peak power for the amplifies output pulses 44. Typically the curve 62 can be chosen for operating the apparatus/system 10. Also, a laser oscillator 12 with shorter pulses and/or higher peak powers can be used which may be achievable with the current state of technology.

FIG. 3 is an exemplary plot 70 of a sliced pulse width in a time domain for a laser system similar to the one shown in FIG. 1, but with the optical amplifier 16 being placed before the pulse slicer 14 right after the laser oscillator 12. In FIG. 1, in contrast, the optical amplifier is placed in a preferred position after the pulse slicer 14. In the situation in which the optical amplifier is placed right after the laser oscillator, the slicing is symmetrical to the amplified optical pulse 72. For example, with a full pulse 72 of about 8 ns (at FWHM), a sliced 4 ns pulse is represented by the symmetric curve E-D-A-D1-E1, a sliced 2 ns pulse is represented by the symmetric curve F-C-A-C1-F1, and a sliced 0.5 ns pulse is represented by the symmetric curve G-B-A-B1-G1. This approach is one possible implementation, but the implementation of the system shown in FIG. 1 provides a more efficient amplifier performance.

FIGS. 4A-4B are exemplary time plots of simulated sliced pulses of different pulse widths relative to the instance of a maximum (at Tmax) of a corresponding output optical laser pulse 82. As discussed above in reference to FIG. 1, the rise time (tr) and the fall time (tf) of the sliced pulses are demonstrated for different pulse widths of the sliced pulses, i.e., for 1 ns pulse 84a with dt=0 ns (FIG. 4A), for 3 ns pulse 84b with dt=1⅜ ns (FIG. 4B) and for 6 ns pulse 84c with dt=2 6/7 ns (FIG. 4C) as discussed in reference to FIG. 1, according to various embodiments of the invention.

Figure 5:
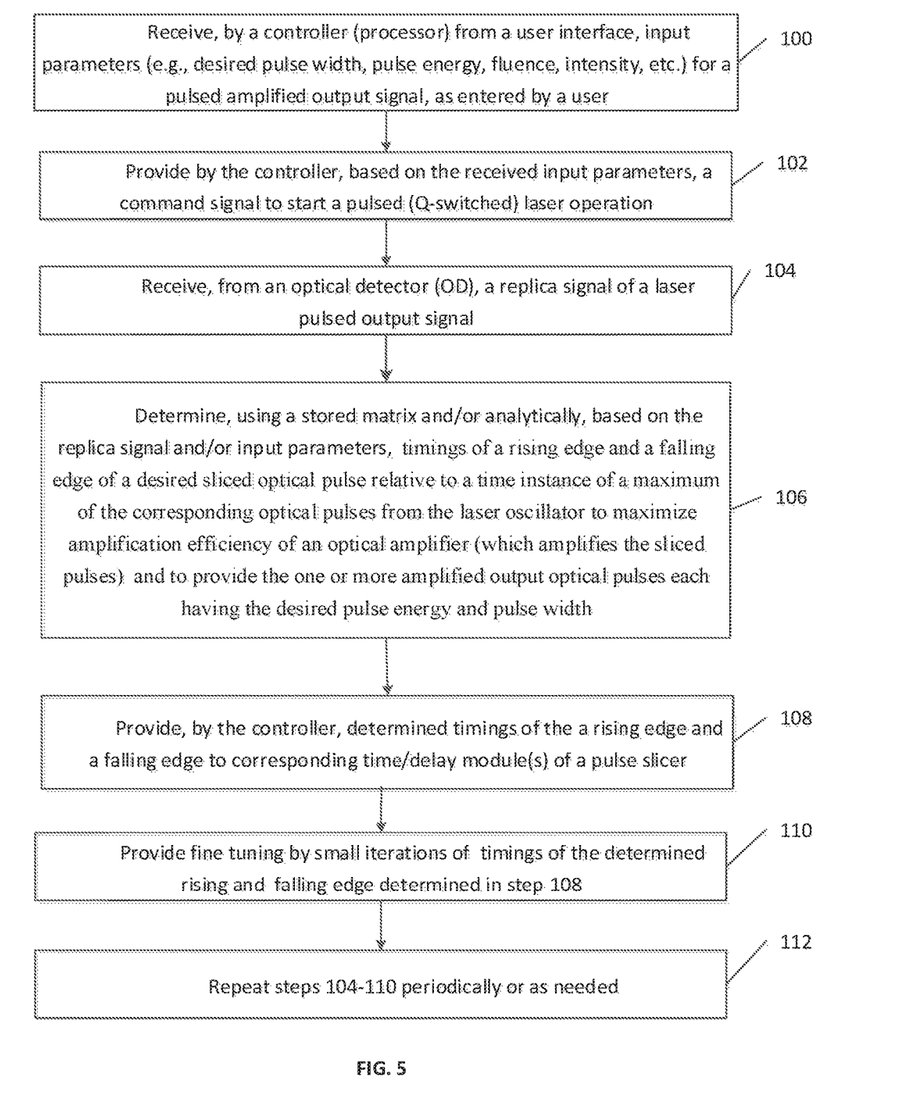
FIG. 5 is a flow chart for implementing an exemplary embodiment of the invention.

FIG. 5 is a flow chart for implementing an exemplary embodiment of the invention. It is noted that the exact sequence or order of steps shown in FIG. 5 is not required, so in principle, the various steps may be performed out of the illustrated order. Also, certain steps may be skipped, different steps may be added or substituted, or selected steps or groups of steps may be performed in a separate application following the embodiments described herein.

In a method according to an exemplary embodiment, as shown in FIG. 5, in a first step 100, a controller/processor receives from a user interface, input parameters (e.g., desired pulse width, pulse energy, fluence, intensity, etc.) for a desired pulsed amplified output signal, as entered by a user through the user interface (e.g., LCD display). In a next step 102, the controller provides, based on the received input parameters, a command signal to start a pulsed (Q-switched) laser operation. In a next step 104, the controller receives, from an optical detector (OD), a replica signal of a laser pulsed output signal in order to coordinate at least timings of the output laser pulse with the timings of the corresponding sliced optical pulse.

In a next step 106, the controller determines, using a stored matrix and/or analytically and based on the replica signal and/or input parameters, timings of a rising edge and a falling edge of a desired sliced optical pulse relative to a time instance of a maximum of the corresponding optical pulses from the laser oscillator to maximize amplification efficiency of an optical amplifier (which amplifies the sliced pulses) and to provide the one or more amplified output optical pulses each having the desired pulse energy and pulse width.

In a next step 108, the controller provides determined timings of the rising and falling edges to corresponding time/delay module(s) of a pulse slicer. In a next step 110, the controller can provide fine tuning by small iterations of timings of the rising and falling edges determined in step 108. In a next step 112, the controller can repeat steps 104-110 periodically and/or as needed.

Unless defined otherwise, technical and scientific terms used herein have the same meaning as is commonly understood by one having ordinary skill in the art to which this disclosure belongs. The terms "first", "second", and the like, as used herein, do not denote any order, quantity, or importance, but rather are employed to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof, as well as additional items. The terms "connected" and "coupled" are not restricted to physical or mechanical connections or couplings, and can include electrical and optical connections or couplings, whether direct or indirect.

Furthermore, the skilled artisan will recognize the interchangeability of various features from different embodiments. The various features described, as well as other known equivalents for each feature, can be mixed and matched by one of ordinary skill in this art, to construct additional systems and techniques in accordance with principles of this disclosure.

In describing alternate embodiments of the light apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is to be understood that the foregoing description is intended to illustrate and not to limit the scope of the invention, which is defined by the scope of the appended claims. Other embodiments are within the scope of the following claims.

It is noted that various non-limiting embodiments described and claimed herein may be used separately, combined or selectively combined for specific applications.

Further, some of the various features of the above non-limiting embodiments may be used to advantage, without the corresponding use of other described features. The foregoing description should therefore be considered as merely illustrative of the principles, teachings and exemplary embodiments of this invention, and not in limitation thereof.

I claim:
1. A system comprising:
a laser oscillator having a lasing medium and a back reflection mirror;
an output mirror, configured to provide one or more output optical pulses;
a pulse forming element between the back reflection mirror and the output mirror, the pulse forming element configured to provide formation of the one or more output optical pulses;

a pulse slicer downstream of the laser oscillator and configured to slice a portion having a desired pulse width of each of the one or more output optical pulses;

an optical amplifier downstream of the pulse slicer and configured to amplify the sliced portion of each of the one or more output optical pulses to a desired pulse energy to provide one or more amplified output optical pulses;

wherein timings of a rising edge and a falling edge of each sliced optical pulse, relative to a time instance of a maximum of the corresponding each of the one or more output optical pulses, is chosen at least to maximize amplification efficiency of the optical amplifier and to provide the one or more amplified output optical pulses each having the desired pulse energy and pulse width;

wherein the pulse forming element is a Q-switch component;

wherein the Q-switch component is one of: a single Pockels cell or a dual Pockels cell;

wherein the Pockels cell in the pulse slicer is a dual Pockels cell, and wherein the rising and falling edges of the each sliced optical pulse may be provided by two separate crystals respectively.

2. The system of claim 1, wherein the two separate crystals are arranged in series and are run by two different voltage drivers connected in parallel.

3. The system of claim 2, wherein one of the two voltage drivers provide a half-wave voltage to one of the two separate crystals that rotates 90 degrees the polarization plane of the output optical pulse so that the pulse goes through a polarizer in the pulse slicer without loss and defines the rising edge of the output pulse.

4. The system of claim 3, wherein the other of the two voltage drivers provides a half-wave voltage to other of the two separate crystals that further rotates 90 degrees the polarization plane of the optical output pulse, so that the output optical pulse would not go through the polarizer in the pulse slicer, thus defining the falling edge of the sliced pulse.

5. The system of claim 1, wherein the one of the single Pockels cell or the dual Pockels cell comprises a single crystal, a central terminal and two end terminals, and wherein the central and each end terminals form a Pockels cell switching element to implement the pulse slicer.

6. The system of claim 1, wherein the pulse slicer comprises an input polarizer and an output polarizer which is crossed with the input polarizer to provide an optical isolation between the laser oscillator and the optical amplifier.

7. The system of claim 1, wherein a range of pulse widths of the amplified output pulses is between 8 nanoseconds and 500 picoseconds.

8. The system of claim 1, wherein the lasing medium comprises a solid-state material.

9. The system of claim 8, wherein the solid-state material comprises a neodymium-doped yttrium aluminum garnet (Nd:YAG).

10. The system of claim 1, wherein the lasing medium comprises a solid-state material pumped by an array of semiconductor lasers.

11. The system of claim 1, wherein the lasing medium comprises a solid-state material pumped by a double flash lamp.

12. The system of claim 1, wherein the pulse slicer is located outside of the laser oscillator.

13. A system comprising:
a laser oscillator having a lasing medium and a back reflection mirror;
an output mirror, configured to provide one or more output optical pulses;
a pulse forming element between the back reflection mirror and the output mirror, the pulse forming element configured to provide formation of the one or more output optical pulses;
a pulse slicer downstream of the laser oscillator and configured to slice a portion having a desired pulse width of each of the one or more output optical pulses;
an optical amplifier downstream of the pulse slicer and configured to amplify the sliced portion of each of the one or more output optical pulses to a desired pulse energy to provide one or more amplified output optical pulses: and,
wherein timings of a rising edge and a falling edge of each sliced optical pulse, relative to a time instance of a maximum of the corresponding each of the one or more output optical pulses, is chosen at least to maximize amplification efficiency of the optical amplifier and to provide the one or more amplified output optical pulses each having the desired pulse energy and pulse width, wherein the timings of the rising edge and the falling edge of each sliced optical pulse relative to the time instance of the maximum of the corresponding each of the one or more output optical pulses is from a matrix stored in a memory of the apparatus, and wherein the matrix is generated for predetermined ranges of input parameters including at least a range of desired pulse widths and a further range of desired pulse energies of the one or more amplified output optical pulses.

14. The system of claim 13, wherein initially determined timings of the rising and falling edges of the each sliced optical pulse is further finely tuned by small changes in the determined timings for optimizing the amplified output optical pulses using an iteration process performed automatically.

15. The system of claim 13, wherein initially determined timings of the rising and falling edges of the each sliced optical pulse is further finely tuned by small changes in the determined timings for optimizing the amplified output optical pulses using an iteration process performed automatically.

16. A system comprising:
a laser oscillator having a lasing medium and a back reflection mirror;
an output mirror, configured to provide one or more output optical pulses;
a pulse forming element between the back reflection mirror and the output mirror, the pulse forming element configured to provide formation of the one or more output optical pulses;
a pulse slicer downstream of the laser oscillator and configured to slice a portion having a desired pulse width of each of the one or more output optical pulses;
an optical amplifier downstream of the pulse slicer and configured to amplify the sliced portion of each of the one or more output optical pulses to a desired pulse energy to provide one or more amplified output optical pulses: and,
wherein timings of a rising edge and a falling edge of each sliced optical pulse, relative to a time instance of a maximum of the corresponding each of the one or more output optical pulses, is chosen at least to maximize amplification efficiency of the optical amplifier and to provide the one or more amplified output optical pulses each having the desired pulse energy and pulse width, wherein the pulse slicer is located inside of the laser oscillator between the reflection mirror and the output optical mirror.

17. A method comprising the steps of:

receiving, by a controller in an apparatus from a user interface, input parameters for one or more output amplified optical pulses including at least a desired pulse width and an energy related parameter determining a desired pulse energy for each of the one or more pulses;

providing, by the controller, in response to the received input parameters, a command signal to start a pulsed laser operation by a laser oscillator of the apparatus;

receiving, by the controller from an optical detector (OD), a replica signal of laser output pulses generated by the laser oscillator; and, determining, based on the received replica signal and at least in part using the input parameters, timings of a rising edge and a falling edge for each of one or more sliced optical pulses relative to a time instance of a maximum of each of the corresponding one or more laser output pulses generated by the laser oscillator to maximize amplification efficiency of an optical amplifier configured to amplify the one or more sliced optical pulses and to provide one or more amplified output optical pulses each having the desired pulse energy and pulse width.

18. The method of claim 17, further comprising: providing fine tuning by small iterations of the determined timings of the rising and falling edges.

* * * * *